United States Patent
Love et al.

(10) Patent No.: US 7,158,482 B2
(45) Date of Patent: Jan. 2, 2007

(54) METHOD AND APPARATUS FOR PREVENTING RECEIVED DATA FROM CORRUPTING PREVIOUSLY PROCESSED DATA IN A WIRELESS COMMUNICATIONS SYSTEM

(75) Inventors: Robert T. Love, Barrington, IL (US); Robert S. Nikides, Carol Stream, IL (US); Louay A. Jalloul, San Jose, CA (US); Mark C. Cudak, McHenry, IL (US); Brian K. Classon, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 1139 days.

(21) Appl. No.: 10/068,443

(22) Filed: Feb. 6, 2002

(65) Prior Publication Data
US 2002/0145985 A1    Oct. 10, 2002

Related U.S. Application Data

(60) Provisional application No. 60/267,028, filed on Feb. 7, 2001.

(51) Int. Cl.
G06F 11/00    (2006.01)
H03M 13/00    (2006.01)
H04L 1/00    (2006.01)
H04J 13/00    (2006.01)

(52) U.S. Cl. .................... 370/252; 375/317; 714/819; 370/342

(58) Field of Classification Search ............... 370/229, 370/230, 241, 242, 252, 335, 342; 375/317; 455/133, 134; 714/48, 49, 799, 819, 822
See application file for complete search history.

(56) References Cited

U.S. PATENT DOCUMENTS

| | | | |
|---|---|---|---|
| 5,457,711 A | * | 10/1995 | Kellermann ............. 375/347 |
| 5,770,927 A | | 6/1998 | Abe |
| 6,208,842 B1 | | 3/2001 | Henderson et al. |
| 2002/0122499 A1 | | 9/2002 | Kannan et al. |

FOREIGN PATENT DOCUMENTS

| GB | 2 348 087 A | 9/2000 |
|---|---|---|
| WO | WO 01/03332 A1 | 1/2001 |

OTHER PUBLICATIONS

Jette et al. "1XTREME Physical Specification for Integrated Data and Voice Services in cdma2000 Spread Spectrum Systems". Motorola, Nokiz, Texas Instruments & LSI Logic. Dec. 2000.
Mandyan et al. "1XTREME Mac Outline". Nokia. 2000. pp. 1-42.

* cited by examiner

*Primary Examiner*—Chau Nguyen
*Assistant Examiner*—Kerri M. Rose
(74) *Attorney, Agent, or Firm*—Steven A. May

(57) ABSTRACT

A communication system includes a forward link from a base station to multiple mobile units, the forward link having multiple shared channels (SHCH's), multiple shared control channels (SHCCH's), and multiple dedicated pointer control channels (DPTRCH's), and utilizes HARQ error control for error detection and error correction. The mobile unit, when listening to the DPTRCH, uses a SHCCH pointed to by the DPTRCH to demodulate and decode data on the SHCH. Throughput problems may arise in the system when the mobile unit combines and decodes the wrong SHCH data, that is, SHCH data that is intended for a different mobile unit, or may incorrectly decodes SHCH data that is intended for the mobile unit. In order to improve the data throughput of the system, the systems employs a flush test and an energy detector test to prevent improperly decoded data blocks from corrupting properly decoded data blocks.

25 Claims, 9 Drawing Sheets

METHOD AND APPARATUS FOR PREVENTING RECEIVED DATA FROM CORRUPTING PREVIOUSLY PROCESSED DATA IN A WIRELESS COMMUNICATIONS SYSTEM

REFERENCE(S) TO RELATED APPLICATION(S)

The present application claims priority from provisional application, Ser. No. 60/267,028, entitled "METHOD AND APPARATUS FOR RECEIVING DATA IN A WIRELESS COMMUNICATIONS SYSTEM," filed Feb. 7, 2001, which is commonly owned and incorporated herein by reference in its entirety.

FIELD OF THE INVENTION

The present invention relates to wireless communications systems and, more particularly, to wireless communication systems that include separate dedicated and shared control channels.

BACKGROUND OF THE INVENTION

Typically in communication systems such as CDMA and, more particularly, CDMA evolutions such as WCDMA, dedicated channels are required for sending data and also for control of the system. Within the forward link of such systems, a single channel is used to carry the information to be transmitted and characteristics of the transmitted information are conveyed on another separate forward control channel. Each of these channels occupies a Walsh code from a finite set of available Walsh codes. To keep the system from becoming Walsh code limited it is important to conserve Walsh code resources. The allocation of these dedicated channels for each user typically requires rapid shuffling between dormant and active states to free up Walsh code resources.

In order to afford more efficient allocation of bits and Walsh codes resources in a spread spectrum communication system, a U.S. patent application Ser. No. 09/703,775 that was filed on Nov. 1, 2000 and entitled "Apparatus and Method for Providing Separate Forward Dedicated and Shared Control Channels in a Communications System," proposed utilizing a Dedicated Pointer Control Channel (DPTRCH), a Shared Control Channel (SHCCH), and a Shared Channel (SHCH), for communications between a transmitting communication device and a receiving communication device. The SHCH may be dynamically allocated among multiple communication devices in a communication system based on information in each of the DPTRCH and the SHCCH.

When a communication system includes a SHCH that is dynamically allocated among multiple receiving communication devices, it is possible for a communication device to decode the wrong SHCH data, that is, SHCH data that is intended for a different communication device. For example, a communication device may listen to a DPTRCH that was previously dedicated to the communication device but is now dedicated to a different communication device, with the result that the communication device decodes SHCCH data intended for the other communication device and may result in the communication device decoding SHCH data intended for the other communication device. Or a communication device may erroneously decode the data in a DPTRCH intended for it and be pointed to the wrong SHCCH.

Decoding data that is intended for a different communication device can create throughput problems in automatic repeat request (ARQ) and Hybrid ARQ (HARQ) communication systems. In an ARQ communication system, correct delivery of data is assured by a receiving communication device requesting retransmissions of erroneously received blocks of data. A HARQ system is similar to an ARQ system in that a receiving communication device requests retransmissions of all data blocks that have been received in error. However, HARQ also saves and uses failed data blocks, that is, the data blocks that have been received in error, at the receiving communication device to increase the coding gain. The failed data blocks are combined with, and jointly decoded with, a currently received data block in order to improve performance.

When a failed data block is not an incorrectly received version of a retransmitted data block, but is instead a data block that was intended for a different communication device, the stored, failed data block can corrupt all previously received data with which it is combined and jointly decoded. For example, a communication device may be in the midst of reception of a data packet comprising multiple transmitted frames when the communication device erroneously decodes a DPTRCH frame and in turn decodes the wrong SHCH. Correct decoding then becomes very difficult, possibly resulting in multiple retransmissions of data by the transmitting communication device up to a predetermined maximum number of retransmissions. The repeated retransmissions of data when there is little chance that the data is going to be correctly decoded is wasted throughput.

Therefore a need exists for preventing improperly decoded data blocks from corrupting previously processed data blocks.

DETAILED DESCRIPTION OF THE INVENTION

Figure 1:
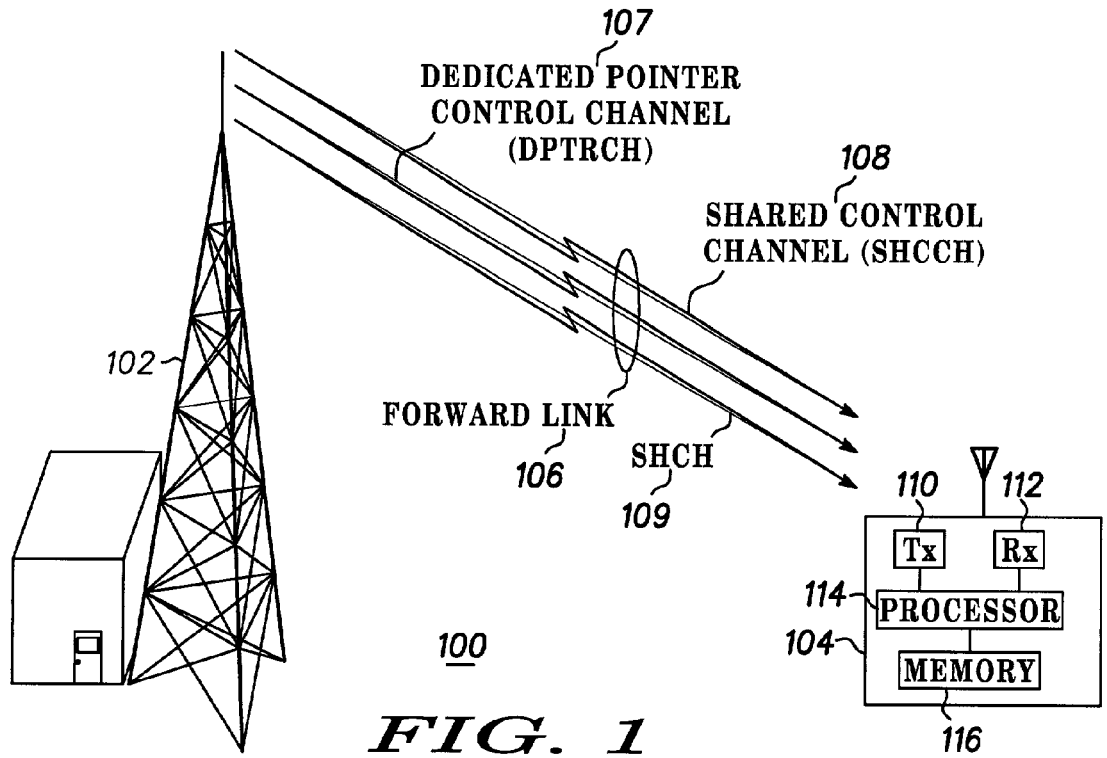
FIG. 1 is a block diagram of a communication system in accordance with an embodiment of the present invention.

To address the need for a method and an apparatus that prevents improperly decoded data blocks from corrupting previously processed data blocks, a communication system is provided that includes a forward link from a base station to multiple mobile units, the forward link having multiple shared channels (SHCH's), multiple shared control channels (SHCCH's), and multiple dedicated pointer control channels (DPTRCH's), and utilizes HARQ error control for error detection and error correction. The mobile unit, when listening to the DPTRCH, uses a SHCCH pointed to by the DPTRCH to demodulate and decode data on the SHCH. Throughput problems may arise in the system when the mobile unit combines and decodes the wrong SHCH data, that is, SHCH data that is intended for a different mobile unit, or may incorrectly decodes SHCH data that is intended for the mobile unit. In order to improve the data throughput of the system, the system employs a flush test and an energy detector test to prevent improperly decoded data blocks from corrupting properly decoded data blocks.

Generally, an embodiment of the present invention encompasses a method for receiving data in a wireless communication system including steps of receiving shared channel data over a shared channel, storing the received shared channel data to produce stored shared channel data, and receiving shared control channel data over a shared control channel. The method further includes steps of decoding the received shared control channel data to produce decoded shared control channel data, determining whether the decoded shared control channel data differs from previously received shared control channel data, and, when the decoded shared control channel data differs from previously received shared control channel data, dispensing with at least one of the decoded shared control channel data and the stored shared channel data.

Another embodiment of the present invention encompasses a method for receiving data in a wireless communication system including steps of receiving data over a control channel to produce received data, determining an energy metric for the received data, comparing the determined energy metric to a threshold, and ignoring the received data when the energy metric compares unfavorably with the threshold.

Yet another embodiment of the present invention encompasses a communication device that includes a receiver and a memory that are each operably coupled to a processor. The receiver receives shared control channel data over a shared control channel and shared channel data over a shared channel. The memory stores previously received shared control channel data and further stores previously received shared channel data to produce stored shared channel data. The processor decodes the received shared control channel data to produce decoded shared control channel data, determines whether the decoded shared control channel data differs from previously received shared control channel data, and when the decoded shared control channel data differs from previously received shared control channel data, dispenses with at least one of the decoded shared control channel data and the stored shared channel data.

Still another embodiment of the present invention encompasses a communication device that includes a receiver operably coupled to a processor. The receiver receives data over a control channel to produce received data. The processor determines an energy metric for the received data, compares the determined energy metric to a threshold, and ignores the received data when the energy metric compares unfavorably with the threshold.

The present invention can be more fully understood with reference to FIGS. 1–12. FIG. 1 illustrates a communication system 100 in accordance with an embodiment of the present invention. Preferably, communication system 100 is a Code Division Multiple Access (CDMA) communication system, such as CDMA 2000 or Wideband CDMA (WCDMA), although the present invention may be used in any communication system that transmits data packets, such as a Time Division Multiple Access (TDMA) communication system or an Orthogonal Frequency Division Multiple Access (OFDM) communication system. Communication system 100 includes a base transceiver station (BTS) 102 and multiple mobile units 104 (one shown), such as cellular telephones, mobile radiotelephones, or any other digital communication devices capable of engaging in a packet data communication. For example, mobile unit 104 may be a StarTAC™ digital cellular telephone available from Motorola, Inc., and modified for the purposes of the present invention. Mobile unit 104 includes a transmitter 110 and a receiver 112 that are each coupled to a processor 114. Processor 114 is further coupled to a memory 116, which memory stores programs executed by the processor in order to perform the functions of mobile unit 104 and includes multiple buffers that can store data, such as control data or traffic data, received by the mobile unit from base station 102. In other embodiments of the present invention, one or more of the multiple buffers may be located in processor 114.

Communication system 100 further includes a forward link 106 from base station 102 to the multiple mobile units, the forward link having multiple shared channels (SHCH's) 109 (one shown), multiple shared control channels (SHCCH's) 108 (one shown), and multiple dedicated pointer control channels (DPTRCH's) 107 (one shown). Communication system 100 also includes a reverse link (not shown) for the transmission of acknowledgments (ACK's or NACK's) from the mobile unit to the base station. In the present system, only DPTRCH 107 is persistent, allowing only those mobile units in an active state that require further control via SHCCH 108 and the forward link SHCH 109 to have more available Walsh codes to use. DPTRCH 107 is used to point to the multiple shared control channels 108 that supplement the payload of DPTRCH 107 in order to convey assignments on the SHCH 109.

Figure 2:
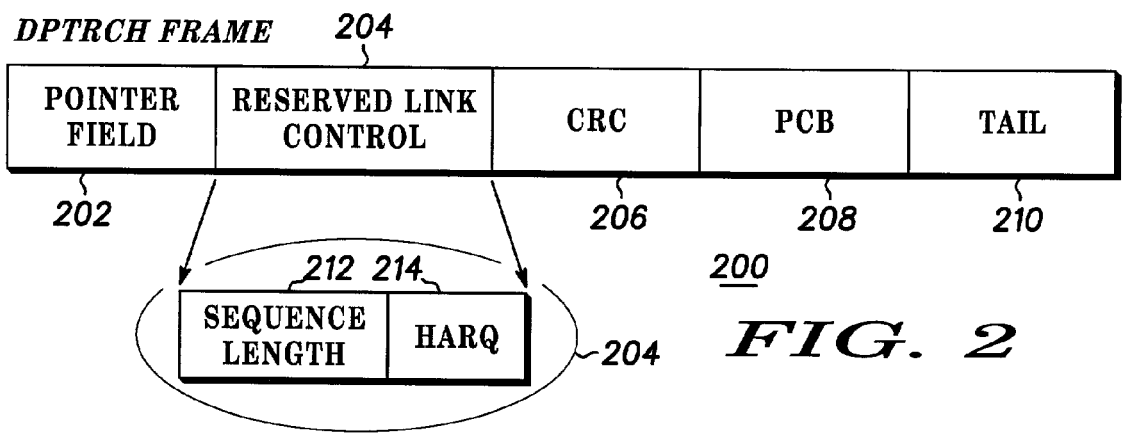
FIG. 2 is a block diagram of a frame format for a dedicated pointer channel in an assignment format in accordance with an embodiment of the present invention.

FIG. 2 illustrates a typical DPTRCH frame 200 in an assignment format (i.e., when the frame is used to convey information concerning SHCCH 108). Within frame 200 are a number of information fields that are used to convey information essential for maintaining users in the cell area of base station 102, whether in inactive or control hold state. The first field is an indicator or pointer field 202 that communicates whether information on a shared control channel SHCCH needs to be transmitted and the Walsh code assignment of the particular shared control channel SHCCH to which this field points. Pointer field 202 may be of any length necessary to communicate the number of different shared channel Walsh codes allocated for the shared channels. In one embodiment of the present invention, pointer field 202 is set at 3 bits, which is capable of communicating up to 8 different states of the SHCCH.

The next field within DPTRCH frame 200 is a reserved link control field 204 that is used to communicate information such as the message sequence length shown in field 212 contained within reserved link control field 204. Preferably, reserved link control field 204 further includes a hybrid automatic repeat request (HARQ) field, shown in field 214 of the reserve link control 204, and reverse link scheduling information (not shown). Further information that may be included in reserved link control field 204 are a starting Walsh code, a modulation coding scheme (MCS), and automatic repeat request (ARQ) information.

DPTRCH frame 200 may further include a field 206 for error detection, such as cyclic redundancy check (CRC) information. Additionally, frame 200 may include power control bit information 208 to regulate the reverse link power for a CDMA system and a tail 210 for terminating the convolutional code, if used. Typically, DPTRCH frame 200 is 5 milliseconds long. However, the time length of a DPTRCH frame is not limited to this amount and could be modified to whatever particular communication system the frame is being used in. Similarly, the fields and width in bits may also be modified in the DPTRCH frame, for example, setting a length of one or more of fields 204, 206, 208, and 210 to zero (0) bits, without departing from the spirit and scope of the present invention. By way of another example, the DPTRCH frame could be reduced to just a pointer filed that is sent on just a single modulated symbol.

Figure 3:
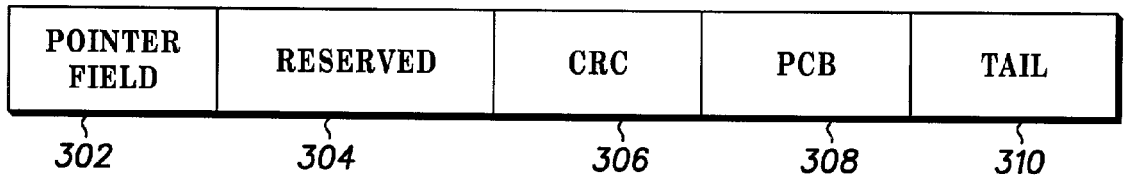
FIG. 3 is a block diagram a frame format for a dedicated pointer channel in a null format in accordance with an embodiment of the present invention.

FIG. 3 illustrates a DPTRCH frame 300 in a "null" format, that is, when information is not required to be transmitted on a corresponding SHCCH, in accordance with an embodiment of the present invention. Similar to the assignment format 200, null frame 300 contains a pointer field 302, a CRC field 306, a power control bit field 308 and a tail 310. Different from assignment format 200, null frame format 300 merely transmits a reserved field 304 containing reverse link scheduling information for the reverse link in a CDMA system.

Figure 4:
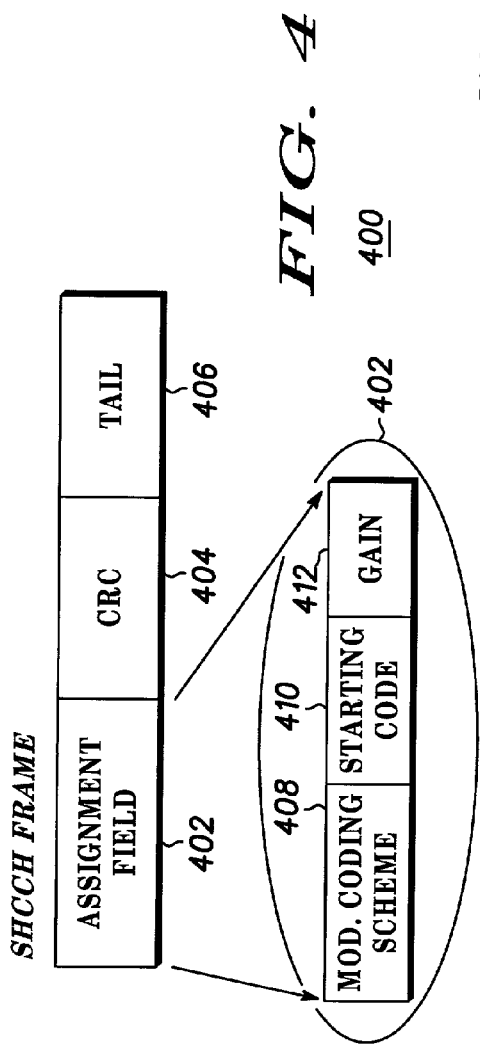
FIG. 4 is a block diagram of a frame format of a shared control channel in accordance with an embodiment of the present invention.

FIG. 4 illustrates a SHCCH frame 400 in accordance with an embodiment of the present invention. SHCCH frame 400 includes an assignment field 402 having various aperiodic or intermittent information such as information required for demodulation of the SHCH and as a transport for HARQ feedback in layer 3 signaling information. The assignment field 402 of SHCCH frame 400 is shown to include fields 408, 410, and 412, which may include a field 408 for indicating a particular modulation and coding scheme (MCS) that is used in the SHCH, a starting Walsh code 410 and gain information 412. Similar to the DPTRCH frame, SHCCH frame 400 may also include a CRC field 404 and tail information in field 406 that may each be of a varied length, for example, of a length of zero (0) bits. In another embodiment of the present invention, assignment field 402 may instead contain gain information, HARQ information and Layer 3 signaling information, while DPTRCH frame 200 carries information concerning the starting Walsh codes, the MCS and further HARQ information. Other combinations of field assignments to DPTRCH frame 200 and SHCCH frame 400 are also possible. In addition, further enhancements of the scheme are readily observable, such as additional levels of SHCCH and joint coding (either correction or error detection) across the codes a mobile unit receives and uses.

Within the present system, to ensure that sufficient number of Walsh codes are available for the forward shared channels, DPTRCH 107 and SHCCH 108 are assigned to part of a Walsh code tree that does not overlap with the codes for the forward SHCH 109. For example, for Walsh codes of length 16, DPTRCH 107 and SHCCH 108 would be assigned to a portion of a Walsh code tree that does not overlap with codes 2–15 of length 16, for instance. Preferably, mobile units in the active state maintain a unique DPTRCH that is assigned a Walsh code of length 512.

Figure 5:
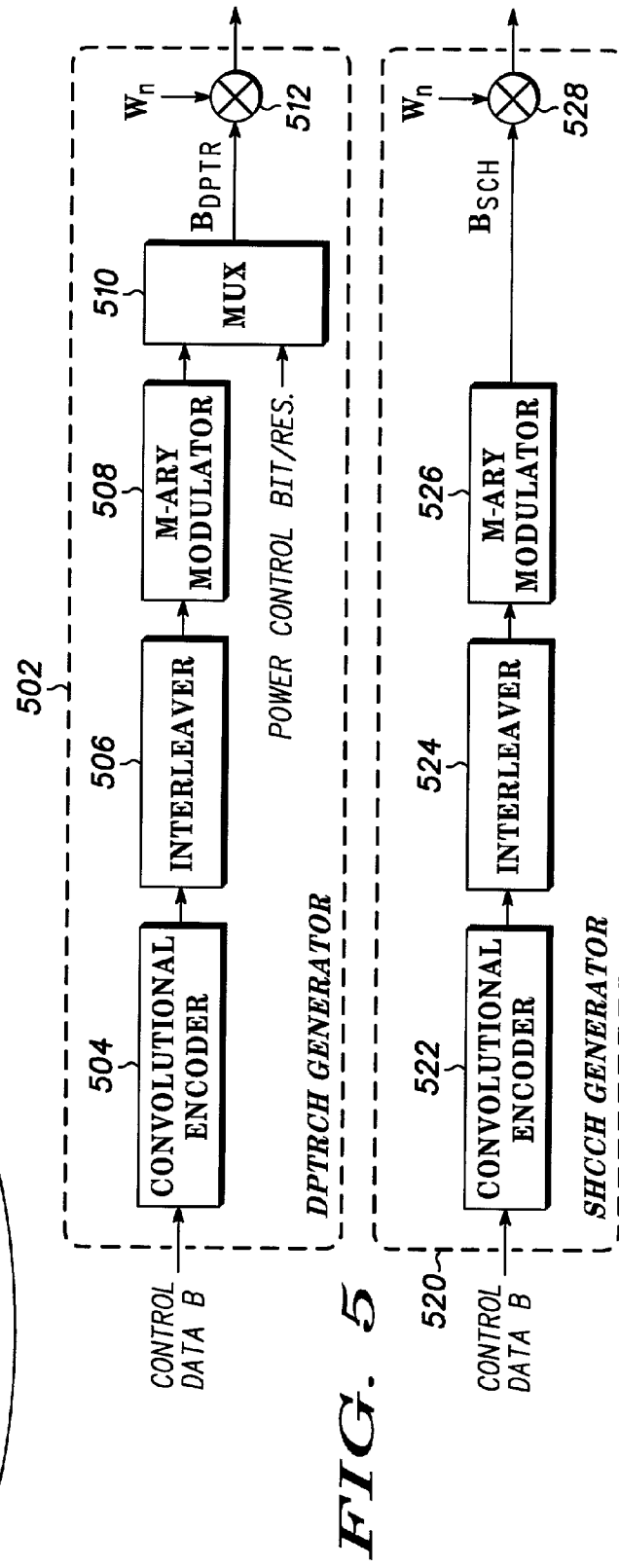
FIG. 5 is a block diagram of a dedicated pointer channel frame generator and a shared control channel frame generator in accordance with an embodiment of the present invention.

FIG. 5 illustrates an apparatus included in base station 102 for generating a DPTRCH frame 200, 300 and a SHCCH frame 400. A DPTRCH generator 502 includes a channel encoder 504 that receives control data 'B' from a transmitter (e.g., a base station) as input thereto. The best encoder with reasonable complexity should be used. For example, BCH, tailed convolutional codes, and tailbiting convolutional codes can each be used in coding of data without departing from the spirit and scope of the present invention. Tailbiting decoding of 16 or 64 state codes may offer improved performance on short codewords. Tailbiting is used for the header in EDGE EGPRS. Tailbiting can also make more bits available for the error detection fields, or other fields. Channel encoder 504 encodes the data at a particular coding rate (e.g., R=½ rate sets). The encoded data is then sent to an interleaver 506 that interleaves the data according to any number of known interleaving schemes. After the data is interleaved, an M-ary modulator 508 modulates the data according to any number of known modulation schemes such as quadrature phase shift keying (QPSK), 16-ary quadrature amplitude modulation (16-QAM), or 64-ary quadrature amplitude modulation (64-QAM). The modulated data is then sent to multiplexer 510, which multiplexes the modulated data with power control bit information. The power control bit is included in the DPTRCH frame since this information is required for each mobile unit within the base station 102 cell, irrespective of whether the mobile unit is in an active state or a dedicated state (an active state being when data is transmitted to be received by the mobile unit and a dedicated state being when no data is transmitted to the mobile unit). The multiplexed data $B_{DPTR}$ output from the multiplexer 510 is then multiplied by a multiplier 512 with a Walsh code $w_n$ and output for transmission at a particular chip rate $R_c$. Preferably, the chip rate is equal to 1.2288 million chips per second (Mcps) according to the IS95 standard or 3.84 Mcps according to WCDMA.

A SHCCH frame generator 520 contains similar elements as the DPTRCH frame generator 502, including a convolutional encoder 522, an interleaver 524, and an M-ary modulator 526. However, SHCCH generator 520 does not require a multiplexer since the power control bit information is sent only via the DPTRCH frame. Thus the modulated control data $B_{SCH}$ from the modulator 526 is multiplied by multiplier 528 by Walsh codes $w_n$ for transmission on forward link 106. Of course, if a mobile unit to which control data is sent is in the dedicated state then no control data $B_{SCH}$ will be transmitted via SHCCH frame generator 520.

Figure 6:
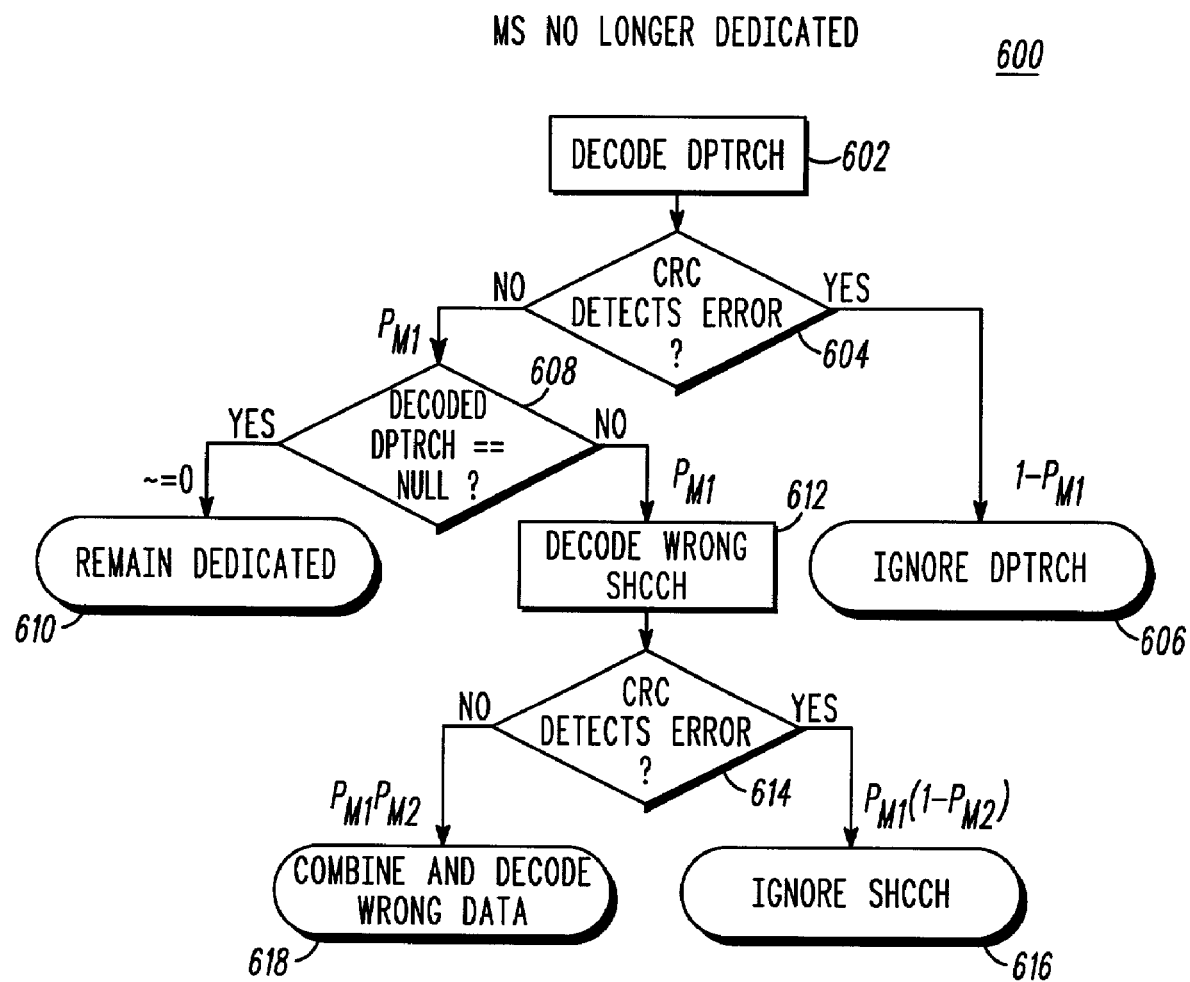
FIG. 6 is a logic flow diagram of exemplary steps executed by a mobile unit that is transitioning from a dedicated state to a dormant state to decode received data.
Figure 7:
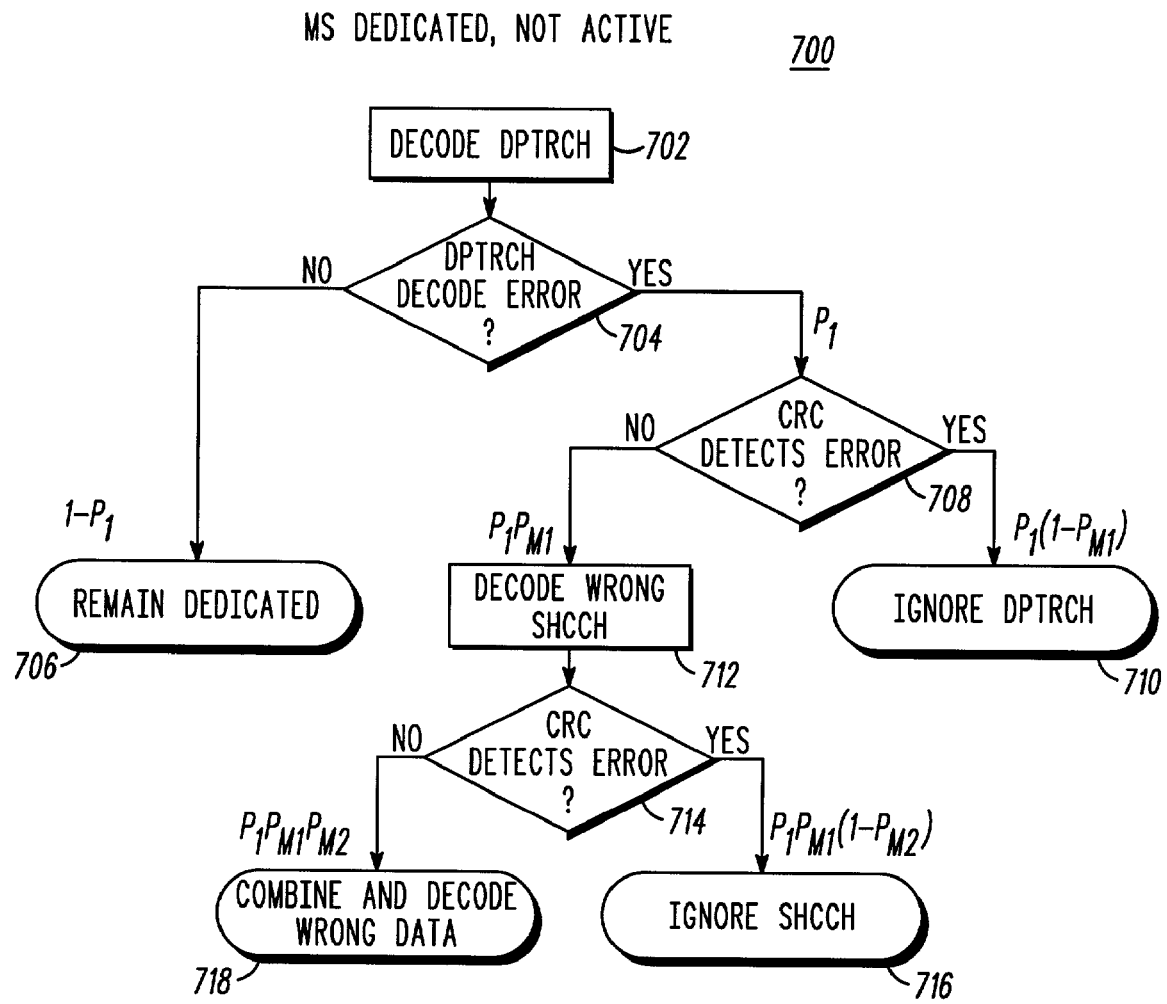
FIG. 7 is a logic flow diagram of exemplary steps executed by a mobile unit that is in a dedicated state to decode received data.
Figure 8:
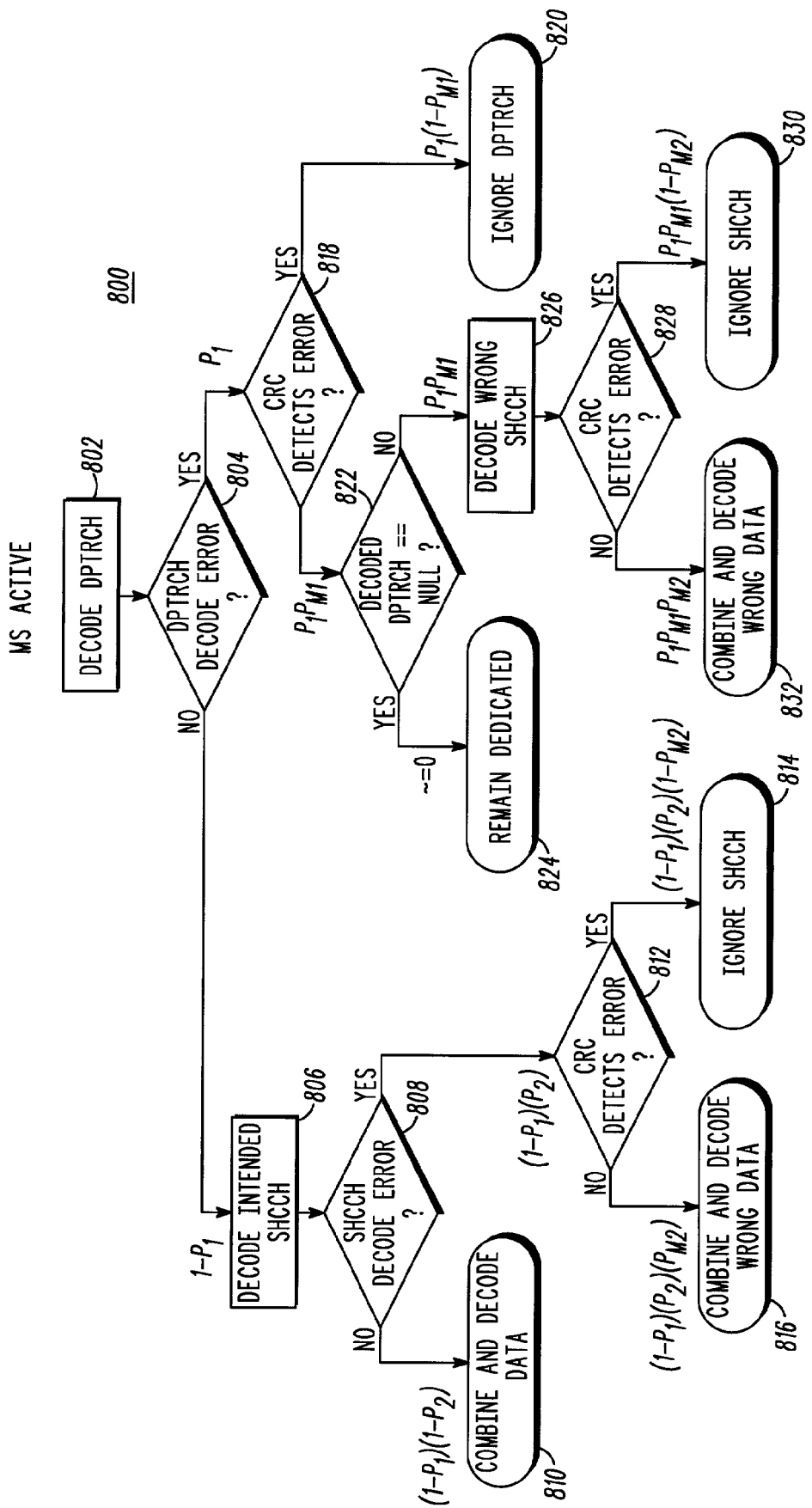
FIG. 8 is a logic flow diagram of exemplary steps executed by a mobile unit that is in an active state to decode received data.

Referring now to FIGS. 6, 7 and 8, potential problems in a performance of an exemplary communication system utilizing a DPRTCH/SHCCH forward link, such as forward link 106, are illustrated. The logic flows depicted in FIGS. 6, 7, and 8 assume the use of coloring, which greatly reduces the probability of misinterpreting another mobile unit's DPTRCH or SHCCH. FIG. 6 is a logic flow diagram 600 of an exemplary process of decoding of a received DPTRCH frame, such as DPTRCH frames 200 and 300, and a received SHCCH frame, such as SHCCH frame 400, by a mobile unit that is no longer in a dedicated state, for example, by a mobile unit that is transitioning from a dedicated state to a dormant state. For example, a first mobile unit may have been in a dedicated state with respect to a previous transmission, by a base station, of a DPTRCH frame on a DPTRCH, such as DPTRCH 107, dedicated to the mobile unit. The base station believes the first mobile unit to be dormant and has dedicated the DPTRCH to a second mobile unit. The first mobile unit, however, has not yet completed a transition to a dormant state and is still listening to the DPTRCH. Unaware that the first mobile unit is still listening to the DPTRCH, the base station transmits a DPTRCH frame to the second mobile unit via the DPTRCH.

Logic flow 600 begins when the first mobile unit receives the DPTRCH frame via the DPTRCH and decodes (602) the frame. The DPTRCH frame is decoded in error since the frame was not intended for the first mobile unit. An error detection check, such as a CRC check, is performed by the first mobile unit on the erroneously decoded DPTRCH frame to determine whether the frame was correctly received and decoded. When the error detection check on the decoded DPTRCH frame detects (604) an error, the first mobile unit ignores (606) the DPTRCH frame, which is a favorable outcome. Assuming that '$P_{M1}$' represents the probability that an error detection check of a decoded DPTRCH frame fails to detect an error in the frame when the frame is decoded in error (that is, a "DPTRCH error detection miss"), then the probability that the first mobile unit correctly detects (604) an error in the frame and ignores (606) the frame is '$1-P_{M1}$'. It should be noted that if no error detection is used, then $P_{M1}=1$.

When the error detection check fails to detect (604) an error in the decoded DPTRCH frame (a probability of $P_{M1}$), and the decoded DPRTCH frame is a null frame (608), then the first mobile unit remains in a dedicated state (610) and a somewhat favorable outcome is achieved. When the DPRTCH Error detection check fails to detect (604) an error in the decoded DPRTCH frame and the frame is not a null frame (608), then the first mobile unit improperly decodes (612) a SHCCH frame, such as SHCCH frame 400, in a SHCCH, such as SHCCH 108, identified by the DPTRCH frame (a probability of approximately $P_{M1}$). The first mobile unit then performs (614) an error correction check, such as a CRC check, on the decoded SHCCH frame. When the SHCCH Error detection check detects (614) an error in the SHCCH frame, the first mobile unit 104 ignores (616) the SHCCH frame, which is a somewhat favorable outcome. Assuming that '$P_{M2}$' represents the probability that an Error detection check of a SHCCH frame fails to detect an error in the frame when the SHCCH frame is decoded in error (that is, a "SHCCH error detection miss"), then the probability that the first mobile unit correctly detects (614) an incorrectly received and/or decoded SHCCH frame and ignores (616) the SHCCH frame is approximately '$P_{M1}(1-P_{M2})$'.

When the first mobile unit decodes a SHCCH frame that is not intended for the mobile unit (612) and the SHCCH error detection check fails to detect (614) an error in the SHCCH frame (a probability of approximately '$P_{M1}P_{M2}$'), then the first mobile unit decodes SHCH data based on information in the SHCCH frame and stores the decoded SHCH data. The stored data is then used by the first mobile unit to decode previously received data (618). This is the worst possible outcome depicted in FIG. 6. The first mobile unit, which is no longer dedicated, has misinterpreted a DPTRCH frame and decoded a SHCCH frame in a SHCCH channel not assigned to the mobile unit ('decode wrong SHCCH'). As a result, the first mobile unit decodes and stores data not intended for the mobile. In a HARQ system, the first mobile unit may then combine the improperly decoded data with previously processed SHCH data and jointly decode the combined data ('combine and decode wrong data'), possibly corrupting data previously received by the first mobile unit that is part of a packet in progress but that is not actively being worked on. In terms of probabilities, P{ignore DPTRCH}=$1-P_{M1}$,
P{decode wrong SHCCH}=$P_{M1}$, and
P{ignore DPTRCH}+P{decode wrong SHCCH}=1.
Expanding P{decode wrong SHCCH},
P{decode wrong SHCCH, ignore SHCCH}=$P_{M1}(1-P_{M2})$,
P{decode wrong SHCCH, combine and decode wrong data}=$P_{M1}P_{M2}$.

FIG. 7 is a logic flow diagram 700 of an exemplary process of a decoding of a received DPTRCH frame, such as DPTRCH frames 200, 300, and a received SHCCH frame, such as SHCCH frame 400, by a mobile unit that is in a dedicated state. The logic flow 700 begins when the mobile unit receives a DPTRCH frame intended for the mobile unit via a DPTRCH, such as DPTRCH 107, and decodes (702) the frame. The process depicted in FIG. 7 assumes that a SHCCH, such as SHCCH 108, has not been assigned to the mobile unit and that the DPTRCH frame is not intended to point the mobile unit to a SHCCH nor to transition the mobile unit to an active state. When the DPTRCH frame is correctly decoded by the mobile unit (704), the mobile unit maintains its dedicated state (706) and continues to monitor the DPTRCH dedicated to the mobile unit, which is a favorable outcome. Assuming that '$P_1$' represents the probability that the DPTRCH frame is incorrectly received and/or incorrectly or improperly decoded, then the probability that the mobile unit correctly decodes (704) the DPTRCH frame and correctly remains in a dedicated state (706) is '$1-P_1$'.

When the mobile unit incorrectly receives and/or decodes (704) the DPTRCH frame (a probability of '$P_1$'), or improperly decodes a DPTRCH frame in a DPTRCH that is dedicated to a different mobile unit, and an error detection check of the DPTRCH frame detects (708) an error in the incorrectly received and/or incorrectly or improperly decoded DPTRCH frame (a probability of '$P_1(1-P_{M1})$'), then the mobile unit ignores (710) the DPTRCH frame, which is a somewhat favorable outcome. When the DPTRCH error detection check of the incorrectly received and/or incorrectly or improperly decoded DPTRCH frame fails to detect (708) an error in the decoded DPRTCH frame, then the mobile unit improperly decodes (712) a SHCCH frame, such as SHCCH frame 400, in a SHCCH, such as SHCCH 108, that the mobile believes is pointed to by the DPTRCH frame (a probability of '$P_1P_{M1}$'), but which SHCCH is not assigned to the mobile unit. The mobile unit then performs (714) an error detection check, such as a CRC check, on the decoded SHCCH frame.

When the SHCCH error detection check detects (714) an error in the SHCCH frame, the mobile unit 104 ignores (716) the SHCCH frame (a probability of '$P_1P_{M1}(1-P_{M2})$').

This is a somewhat favorable outcome since the SHCCH frame includes data not intended for, nor properly decodable by, the mobile unit. However, when the mobile unit decodes a SHCCH frame that is not intended for the mobile unit (712) and the SHCCH error detection check fails to detect (714) an error in the SHCCH data (a probability of $P_1 P_{M1} P_{M2}$), then the mobile unit decodes SHCH data based on information in the SHCCH frame, which SHCH data was not intended for the mobile unit, and stores the decoded SHCH data. The stored SHCH data is then used by the mobile unit for combination with, and joint decoding of, previously received SHCH data (718). This is a very unfavorable outcome since the erroneously decoded SHCH data can corrupt a decoding of the previously received data.

The desired outcomes of flow 700 depicted in FIG. 7 are the blocks 'no DPTRCH decode error' (704) and 'remain dedicated' (706). The outcomes 'ignore DPTRCH' (710) or 'decode wrong SHCCH' (712) are both undesired outcomes. The undesired outcome 'ignore DPTRCH' (710) can have nearly the same effect as 'no DPTRCH decode error' if the mobile unit is required to see at least two DPTRCH frames before going dormant. However, the 'decode wrong SHCCH' outcome (712) can possibly corrupt receiver buffers if it results in 'combine and decode wrong data' (718). In terms of probabilities, P{no DPTRCH decode error}=P{remain dedicated}=1−$P_1$ P{ignore DPTRCH}=$P_1(1-P_{M1})$,
P{decode wrong SHCCH}=$P_1 P_{M1}$, and
P{no DPTRCH decode error}+P{ignore DPTRCH}+P{decode wrong SHCCH}=1.

Expanding P{decode wrong SHCCH},
P{decode wrong SHCCH, ignore SHCCH}=$P_1 P_{M1}(1-P_{M2})$,
P{decode wrong SHCCH, combine and decode wrong data}=$P_1 P_{M1} P_{M2}$.

FIG. 8 is a logic flow diagram 800 of an exemplary process of a decoding of a DPTRCH frame, such as DPTRCH frames 200, 300, and a SHCCH frame, such as SHCCH frame 400, by a mobile unit that is in an active state. Logic flow diagram 800 assumes that data in an SHCCH frame is colored. The logic flow begins when the mobile unit receives a DPTRCH frame intended for the mobile unit via a DPTRCH 107 and decodes (802) the frame. The process depicted in FIG. 8 assumes that the DPTRCH frame is intended to point the mobile unit to a SHCCH, such as SHCCH 108, that is assigned to the mobile unit. When the DPTRCH frame is correctly decoded by the mobile unit (804) (a probability of '1−$P_1$'), the mobile unit properly decodes (806) a SHCCH frame in the SHCCH identified by the DPTRCH frame and assigned to the mobile unit.

When the mobile unit correctly decodes (808) the SHCCH frame (a probability of '(1−$P_1$)(1−$P_2$)'), then the mobile unit decodes SHCH data based on information in the SHCCH frame and stores the decoded SHCH data. The stored SHCH data is then used by the mobile unit for combination with, and joint decoding of, previously received SHCH data (810), and a favorable outcome is achieved. When the mobile unit erroneously decodes (808) the SHCCH frame (a probability of '(1−$P_1$)$P_2$') and an error detection check of the decoded SHCCH data detects an error (812) in the decoded SHCCH data (a probability of '(1−$P_1$)($P_2$)(1−$P_{M2}$)'), then the SHCCH frame is ignored (814) and a somewhat favorable outcome is attained. When the mobile unit erroneously decodes (808) the SHCCH frame and an error detection check of the decoded SHCCH data fails to detect an error (812) in the decoded SHCCH data (a probability of '(1$P_1$)($P_2$)($P_{M2}$)'), then the mobile unit incorrectly decodes SHCH data based on the erroneously decoded SHCCH data. For example, the mobile unit may decode the SHCH data using a wrong modulation scheme or a wrong code rate, or may decode data in a wrong SCHC channel. The mobile unit stores the incorrectly decoded SHCH data and uses the stored SHCH data for combination with, and decoding of, previously received data (816). This is a very unfavorable outcome since the incorrectly decoded SHCH data can corrupt the decoding of the previously received data.

When the mobile unit incorrectly receives and/or decodes (804) the DPTRCH frame (a probability of '$P_1$'), and an error detection check of the DPTRCH frame detects (818) an error in the incorrectly received and/or decoded DPTRCH frame (a probability of '$P_1(1-P_{M1})$'), then the mobile unit ignores (820) the DPTRCH frame, which is a favorable outcome. When the mobile unit incorrectly receives and/or decodes (804) the DPTRCH frame (a probability of '$P_1$'), and an error detection check of the DPTRCH frame fails to detect (818) an error in the incorrectly received and/or decoded DPTRCH frame (a probability of '$P_1 P_{M1}$'), but the incorrectly received and/or decoded DPTRCH frame is a null frame (822), then the mobile unit transitions to a dedicated state (824) and continues to monitor the DPTRCH dedicated to the mobile unit. This is a somewhat favorable outcome, since the mobile unit has not stored any incorrectly decoded data that could corrupt previously received data and the mobile unit is still monitoring the DPTRCH.

When the mobile unit incorrectly receives and/or decodes (804) the DPTRCH frame (a probability of '$P_1$'), and an error detection check of the DPTRCH frame fails to detect (818) an error in the incorrectly received and/or decoded DPTRCH frame (a probability of '$P_1 P_{M1}$'), and the incorrectly received and/or decoded DPTRCH frame is not a null frame (822), then the mobile unit erroneously decodes (826) a SHCCH frame misidentified in the incorrectly received and/or decoded DPTRCH frame (a probability of '$P_1 P_{M1}$'). When an error detection check of the decoded SHCCH data detects an error (828) in the decoded SHCCH data (a probability of '$P_1 P_{M1}(1-P_{M2})$'), then the SHCCH frame is ignored (830) and a somewhat favorable outcome is attained. When the mobile unit erroneously decodes (826) the SHCCH frame and an error detection check of the decoded SHCCH data fails to detect an error (828) in the decoded SHCCH data (a probability of '$P_1 P_{M1} P_{M2}$'), then the mobile unit incorrectly decodes SHCH data based on the erroneously decoded SHCCH data, as described above. The mobile unit stores the incorrectly decoded SHCH data and uses the stored SHCH data for combination with, and decoding of, previously received data (832). This is a very unfavorable outcome since the incorrectly decoded SHCH The desired outcome of flow 800 depicted in FIG. 8 involves both a successful DPTRCH decode and a successful SHCCH decode. For the DPTRCH decode, the desired outcome is the logic flow that includes the blocks 'no DPTRCH decode error' (804) and correct decoding of intended SHCCH frame (806, 808, 810). Undesired outcomes include the blocks 'ignore DPTRCH' (820), and 'decode wrong SHCCH' (826). 'Ignore DPTRCH' is more significant when the mobile unit is in an active state than when the mobile unit is in a dedicated state because a frame of throughput is lost. The outcome 'decode wrong SHCCH' (826) can possibly corrupt receiver buffers if it results in the 'combine and decode wrong data' (832) outcome.

For the SHCCH decode, the desired outcome is 'combine and decode data' (810). This desired outcome can only occur after a 'decode intended SHCCH' result (806) from the DPTRCH decode (802, 804). Undesired outcomes corresponding to the block 'decode intended SHCCH' (806) are 'ignore SHCCH' (814) (loss of a frame of throughput) and 'combine and decode wrong data' (816) (possibly corrupt receiver buffers). In terms of probabilities, P{no DPTRCH decode error}=P{decode intended SHCCH}=1-$P_1$ P{ignore DPTRCH}=$P_1(1-P_{M1})$,
P{decode wrong SHCCH}=$P_1 P_{M1}$, and
P{no DPTRCH decode error}+P{ignore DPTRCH}+P{decode wrong SHCCH}=1.

Expanding P{decode intended SHCCH},
P{decode intended SHCCH, combine and decode data}= $(1-P_1)(1-P_2)$,
P{decode intended SHCCH, ignore SHCCH}=$(1-P_1)(P_2)(1-P_{M2})$,
P{decode intended SHCCH, combine and decode wrong data}=$(1-P_1)(P_2)(P_{M2})$.

Expanding P{decode wrong SHCCH},
P{decode wrong SHCCH, ignore SHCCH}=$P_1 P_{M1}(1-P_{M2})$,
P{decode wrong SHCCH, combine and decode wrong data}=$P_1 P_{M1} P_{M2}$.

As depicted in FIGS. 6, 7, and 8, when a mobile unit that is decoding received data attains the undesired outcomes 'combine and decode wrong data,' (618, 718, 816, 832), the mobile unit may end up combining and decode the wrong SHCH data, that is, SHCH data that is intended for a different mobile unit, or may incorrectly decode SHCH data that is intended for the mobile unit. The decoding of SHCH data that is intended for a different mobile unit or the incorrect decoding of SHCH data intended for the mobile can create throughput problems in communication systems that utilize HARQ error control for error detection and error correction.

ARQ and HARQ error control are well known in the art. In an ARQ communication system, correct delivery of data is assured by a receiving communication device requesting retransmissions of erroneously received blocks of data. The retransmission request can be ACK or NACK based. Even greater throughputs or error performance can be achieved by use of an HARQ system. An HARQ system is similar to an ARQ system in that a receiving communication device requests retransmissions of all data blocks that have been received in error. However, HARQ improves on standard ARQ methods by saving and using failed data blocks, that is, data blocks that have been received in error, at the receiving communication device to increase the coding gain. The failed data blocks are combined with, and jointly decoded with, a currently received data block in order to improve performance.

In a communication system utilizing HARQ error correction, when a receiving communication device incorrectly decodes SHCH using a wrong coding rate or modulation scheme, or decodes SHCH data that is intended for another communication device, the receiving communication device determines that the data has been received in error and requests a retransmission of the data. The receiving communication device also stores the decoded data in a HARQ buffer. When the receiving communication device receives the retransmitted data, the communication device combines the retransmitted data with the buffered data and jointly decodes the combined data.

When the receiving communication device is in the midst of a communication session with a transmitting communication device and inadvertently stores data from a different communication session that was intended for a different communication device, or incorrectly decodes data as described above, the stored data can corrupt all previously received data with which it is combined and jointly decoded. Correct decoding of retransmissions becomes very difficult, possibly resulting in repeated retransmissions of data by the transmitting communication device up to a predetermined maximum number of retransmissions ("MAX_RETRIES"). The repeated retransmissions of data when there is little chance that the data is going to be correctly decoded is wasted throughput. In order to improve the data throughput of a communication system using ARQ or HARQ error correction, communication system 100 includes a method and an apparatus for preventing improperly decoded data blocks from corrupting previously processed data blocks.

Figure 9:
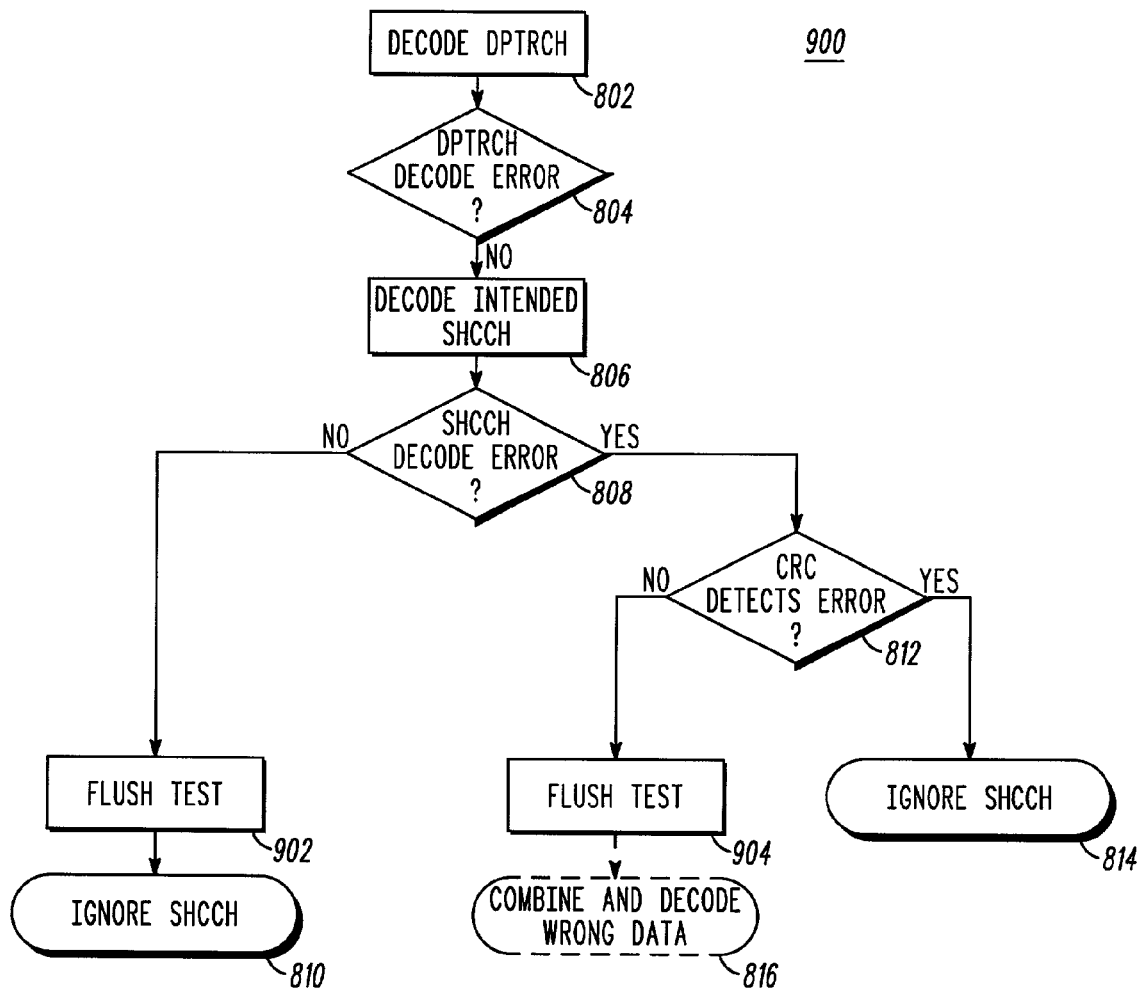
FIG. 9 is a logic flow diagram of the steps executed by the communication system of FIG. 1 in order to increase throughput in accordance with an embodiment of the present invention.
Figure 10:
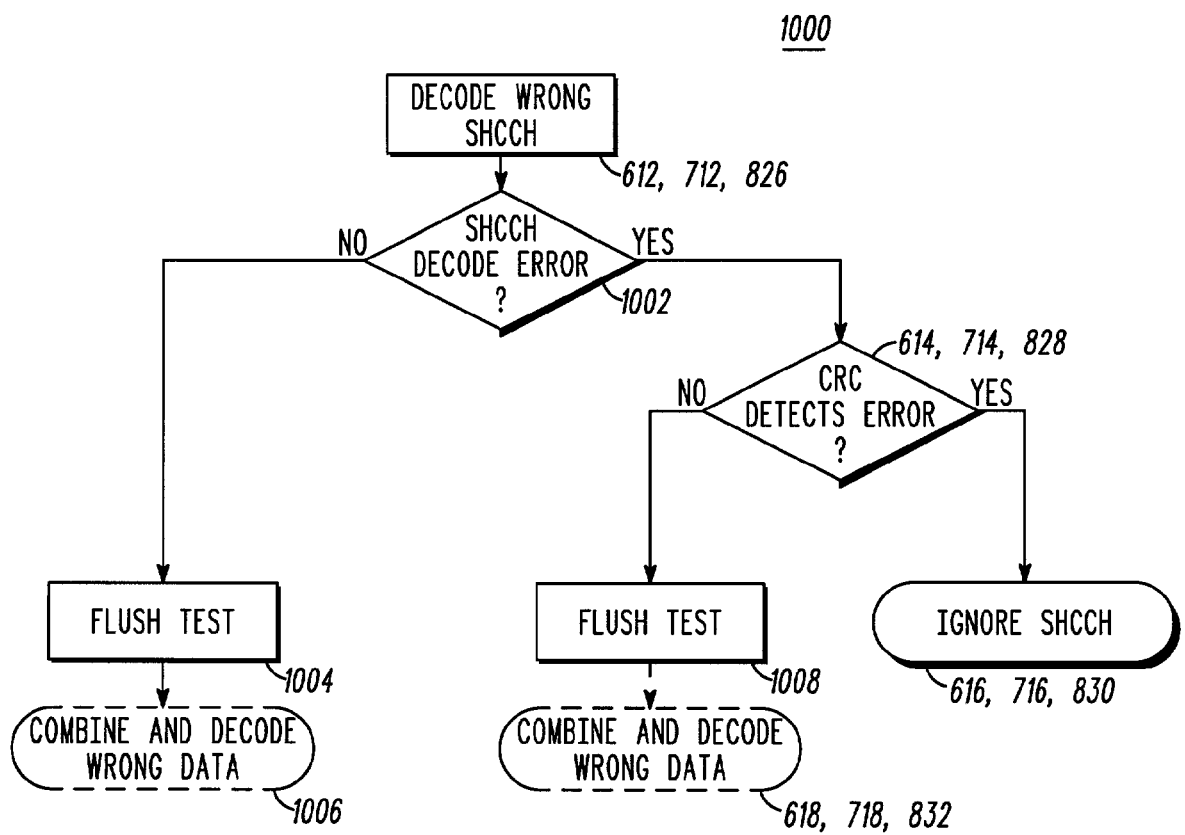
FIG. 10 is a logic flow diagram of the steps executed by the communication system of FIG. 1 in order to increase throughput in accordance with an embodiment of the present invention.

Referring now to FIGS. 9 and 10, a process is depicted whereby communication system 100, preferably processor 114 of mobile unit 104, increases throughput of retransmitted data in accordance with one embodiment, a "flush test" embodiment, of the present invention. The "flush test" provides for a dispensing, by processor 114 of mobile unit 104, with one of currently received control data, such as as DPTRCH frames or SHCCH frames, or stored SHCH data, so that currently received SHCH data that is demodulated and decoded based on the currently received control data, does not corrupt, or is not corrupted by, the stored SHCH data.

In one embodiment of the flush test, when there is a discrepancy between currently received control data, such as DPTRCH frames or SHCCH frames, and previously received and stored control data, such as previously received DPTRCH frames or SHCCH frames, mobile unit 104, preferably processor 114, assumes that the currently received control data is wrong and ignores the currently received control data prior to a retransmission of the control data and SHCH data. Preferably, mobile unit 104 assumes that the currently received control data is wrong when a currently received control frame differs from each of multiple previously received control frames that are stored in memory 116 or in a memory included in processor 114. By ignoring the currently received control data, mobile unit 104 prevents currently received SHCH data blocks, that are improperly decoded based on the currently received control data, from corrupting previously received and properly decoded SHCH data blocks stored in HARQ buffers in memory 116.

In another embodiment of the present invention, when there is a discrepancy between currently received control data and previously received control data, mobile unit 104, preferably processor 114, assumes that the stored SHCH data was improperly demodulated or decoded and purges HARQ buffers in memory 116 of SHCH data stored in the HARQ buffers prior to a retransmission of SHCH data a predetermined maximum number of times. Preferably, mobile unit 104 assumes that the stored SHCH data was improperly demodulated or decoded (i.e., due to a wrong corresponding control frame) when a currently received control frame differs only from the previously received control frame that is stored in memory 116 or in a memory included in processor 114. In this embodiment, the currently received control frame may be compared only to the previously received control frame, subject to the assumption that when there is a discrepancy then the HARQ buffers will be purged. By purging the HARQ buffers, properly decoded currently received SHCH data blocks will not be corrupted by previously received and improperly decoded SHCH data blocks.

In order to prevent improperly decoded SHCH data blocks from corrupting properly decoded SHCH data blocks, the flush test is performed by mobile unit 104, preferably by processor 114, prior to a combining and decoding of SHCH data. That is, four possible outcomes are depicted in each of logic flow diagrams 600, 700, and 800: mobile unit 104 remaining in a dedicated state (610, 706, 824), mobile unit 104 ignoring a SHCCH (616, 716, 814, 830), mobile unit 104 ignoring a DPTRCH (606, 710, 820), and mobile unit 104 combining and decoding SHCH data based on decoded SHCCH data (618, 718, 810, 816, 832). In the flush test embodiment of the present invention, mobile unit 104 performs a modified version of the logic flow diagrams 600, 700, and 800, wherein mobile unit 104 performs a flush test (902, 904, 1004, 1008) prior to combining and decoding SHCH data based on decoded SHCCH data (618, 706, 718, 810, 816, 832). The "flush test" provides for an ignoring, by processor 114 of mobile unit 104, of currently received control data, such as currently received DPTRCH frames or SHCCH frames, or a purging, by processor 114, of SHCH data stored in HARQ buffers in memory 116 of the mobile unit prior to a retransmission of data a predetermined maximum number of times. By ignoring currently received control data or purging the buffers of previously received SHCH data, improperly decoded data blocks are prevented from corrupting properly decoded data blocks.

FIG. 9 is a logic flow diagram 900 of the steps executed by mobile unit 104, when in an active state, to decode a SHCCH intended for the mobile unit and to decode SHCH data in accordance with an embodiment of the present invention. Logic flow diagram 900 is a modified version of logic flow diagram 800, providing an execution of a "flush test" (902, 904) prior to a combining and decoding of SHCH data (810, 816). As depicted in FIG. 9, mobile unit 104, when in an active state, receives a DPTRCH frame 200, 300 intended for the mobile unit via a DPTRCH 107 and decodes (802) the frame. The process assumes that the DPTRCH frame is intended to point mobile unit 104 to a SHCCH, such as SHCCH 108, that is assigned to the mobile unit. When the DPTRCH frame is correctly decoded by the mobile unit (804), mobile unit 102 properly decodes (806) a SHCCH frame, such as SHCCH frame 400, in the SHCCH 108 identified by the DPTRCH frame and assigned to the mobile unit.

When mobile unit 104 correctly decodes (808) the SHCCH frame, the mobile unit then performs a flush test (902). By performing a flush test, mobile unit 102 avoids corruption of properly decoded stored SHCH data or received SHCH data by received SHCH data or stored SHCH data, respectively, that is improperly decoded using a wrong modulation scheme or a wrong code rate, or by decoding data in a wrong SHCH frame. The flush test comprises a determination of whether data in the decoded SHCCH frame differs from previously received SHCCH data, which previously received SHCCH data is stored in memory 116 of mobile unit 104. In one embodiment of the flush test, when the data in the decoded SHCCH frame differs from a previously received SHCCH frame, mobile unit 104, preferably processor 114, assumes that the previous received and stored SHCH data is corrupt and purges HARQ buffers in memory 116. In another embodiment of the flush test, when the data in the decoded SHCCH frame differs from each of multiple previously received SHCCH frames, mobile unit 104, preferably processor 114, assumes that the currently received and decoded SHCCH frame is wrong and ignores the currently received SHCCH frame.

When the data in the decoded SHCCH frame does not differ from previously received SHCCH data, mobile unit 104 decodes SHCH data based on information in the SHCCH frame and stores the decoded SHCH data. The stored SHCH data is then used by the mobile unit for combination with, and joint decoding of, previously received SHCH data (810).

When mobile unit 104 erroneously decodes (808) the SHCCH frame and an error detection check of the decoded SHCCH data fails to detect an error (812) in the decoded SHCCH data, the mobile unit performs a flush test (904). Similar to step (902), in one embodiment of the flush test mobile unit 104 determines whether data in the decoded SHCCH frame differs from previously received SHCCH data. Again, in one embodiment of the present invention, when the data in the decoded SHCCH frame differs from a previously received SHCCH data, mobile unit 104, preferably processor 114, purges HARQ buffers in memory 116. And again, in another embodiment of the flush test, when the data in the decoded SHCCH frame differs from each of multiple previously received SHCCH frames, mobile unit 104, preferably processor 114, assumes that the currently received and decoded SHCCH frame is wrong and ignores the currently received SHCCH frame. By dispensing with one of the currently received SHCCH frame and the previously received SHCH data stored in the HARQ buffers, mobile unit 104 avoids advancing to step 816 and corrupting properly decoded SHCH data with improperly decoded or incorrectly received SHCH data.

FIG. 10 is a logic flow diagram 1000 of steps executed by mobile unit 104 to decode a SHCCH intended for a mobile unit other than the mobile unit and to decode SHCH data in accordance with an embodiment of the present invention. Logic flow diagram 1000 is a modified version of each of logic flows 600, 700, and 800, wherein mobile unit 104 performs a "flush test" (1004), (1008) prior to a combining and decoding of data (1006, 618, 718, 832). As depicted in FIG. 10, mobile unit 104 decodes (612, 712, 826) a SHCCH intended for a mobile unit other than mobile unit 104. For example, mobile unit 104 may have decoded a DPTRCH frame in a DPTRCH intended for a mobile unit other than mobile unit 104, which DPTRCH frame pointed mobile unit 104 to a SHCCH intended for the other mobile unit. By way of another example, mobile unit 104 may have incorrectly decoded a DPTRCH frame, resulting in mobile unit 104 decoding a wrong SHCCH.

When mobile unit 104 correctly decodes the wrong SHCCH (1002) frame, the mobile unit then performs a flush test (1004). As described in greater detail above, mobile unit 104 determines whether data in the decoded SHCCH frame differs from one or more previously received SHCCH frames, which previously received frames are stored in memory 116 of mobile unit 104. In one embodiment of the present invention, the decoded SHCCH frame is compared to a previously received SHCCH frame, and when the frames differ mobile unit 104, preferably processor 114, assumes that the previous received and stored SHCH data is corrupt and purges HARQ buffers in memory 116. In another embodiment of the present invention, when the data in the decoded SHCCH frame is compared to, and differs from, each of multiple previously received SHCCH frames, mobile unit 104, preferably processor 114, assumes that the currently received and decoded SHCCH frame is wrong and ignores the currently received SHCCH frame. When the data in the decoded SHCCH frame differs from previously received SHCCH data, mobile unit 104, preferably processor 114, purges HARQ buffers in memory 116, thereby avoiding advancing to step 1006 and corrupting previously received data with improperly or incorrectly received current data.

When mobile unit 104 erroneously decodes (1002) the SHCCH frame and an error detection check of the decoded SHCCH data fails to detect an error (614, 714, 828) in the decoded SHCCH data, the mobile unit performs (1008) a flush test. Similar to step 1004, in one embodiment of the flush test, the decoded SHCCH frame is compared to a previously received SHCCH frame, and when the frames differ mobile unit 104, preferably processor 114, assumes that the previous received and stored SHCH data is corrupt and purges HARQ buffers in memory 116. In another embodiment of the flush test, when the data in the decoded SHCCH frame is compared to, and differs from, each of multiple previously received SHCCH frames, mobile unit 104, preferably processor 114, assumes that the currently received and decoded SHCCH frame is wrong and ignores the currently received SHCCH frame. By dispensing with one of the currently received SHCCH frame and the previously received SHCH data stored in the HARQ buffers, mobile unit 104 avoids advancing to steps 618,718, and 832 and corrupting previously received data with improperly or incorrectly received current data.

In one embodiment of the flush test, processor 114 purges an HARQ buffer in memory 116 if the current decoded SHCCH information differs from the previous SHCCH in a method that is inconsistent with a protocol causing a protocol error. Each protocol error represents a "flush test". The purge mechanism (not the test itself) to clear the buffer is the same as when a new sequence number is received for a new packet after a successful transmission or give up (max retries) on a previous packet. This will minimize the throughput loss of hopeless retries that are each combined with a corrupted buffer. Examples of protocol errors with respect to the fields defined in the F-SHCCH in the 1*XTREME MAC Outline, Version 9C*, such as:

1) The SN number has changed, but the ABI has not changed.
2) The MCSL has changed from the first attempt, e.g., the MCSL=1 on the first attempt and MCSL=4 on the second attempt; $MCSL_1 \neq MCSL_2$
3) The total number of Walsh codes has changed. Specifically, the difference between fields LC and BC. $(LC_1-BC_1) \neq (LC_2-BC_2)$.
4) SR_ID number has changed.
5) SEQ_UN number has changed.
6) AI received represents disallowed pattern of ARQ instance repetition. For example, 1XTREME does not allow two consecutive frames transmitted to the same mobile to carry the same ARQ instance.

As mentioned above, the "flush test" is performed just prior to the 'combine and decode data' and 'combine and decode wrong data' blocks (the receiver cannot tell which combine and decode will be performed) depicted in FIGS. 9 and 10. The "flush test" has the desired effect when 'combine and decode data' occurs, but unfortunately may throw away acceptable data when 'combine and decode wrong data' occurs.

While the flush tests described above include a comparison between a current frame and a previous active frame, in other embodiments of the flush test a current frame may be compared to multiple previous active frames, as long as all of the frames appear to be of the same packet. As such, a method of voting may be instituted so that receiver action in response to a flush test depends on how many active frames are currently buffered. For example, where only one active frame is in the HARQ buffer in memory 116, processor 114 must decide whether the new frame is good or the buffered frame was good. In this case, processor 114 should discard the HARQ buffer data as described above whenever a 'flush test' is detected. In the case where two or more active frames are in the HARQ buffer and no protocol errors had occurred, then the two or more active frames can suggest that the HARQ buffer contains valid data and the current inconsistent SHCCH frame represents erroneous control information. Therefore, the receiver should ignore the current frame and retain the data in the HARQ buffer.

Figure 11:
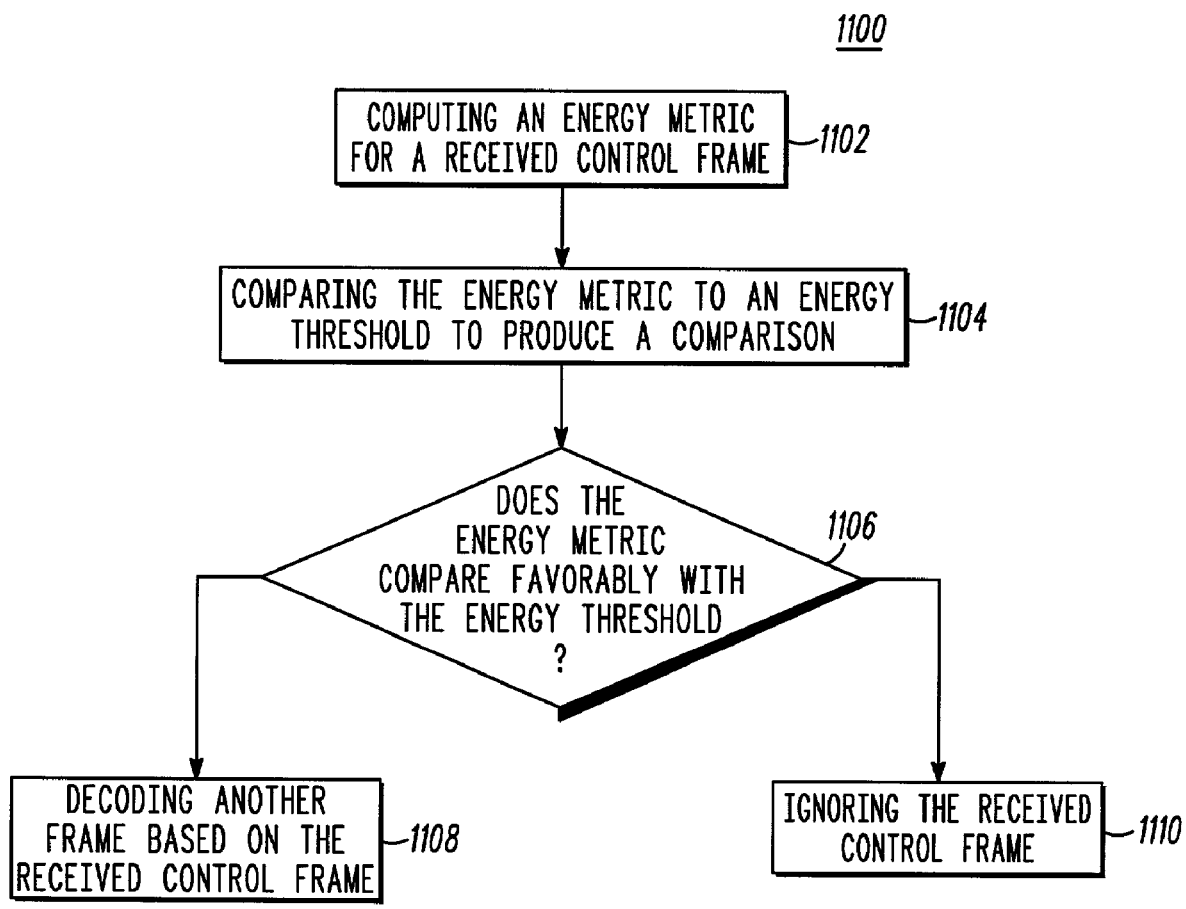
FIG. 11 is a logic flow diagram of the steps executed by the communication system of FIG. 1 in performing an energy detector test in accordance with another embodiment of the present invention.
Figure 12:
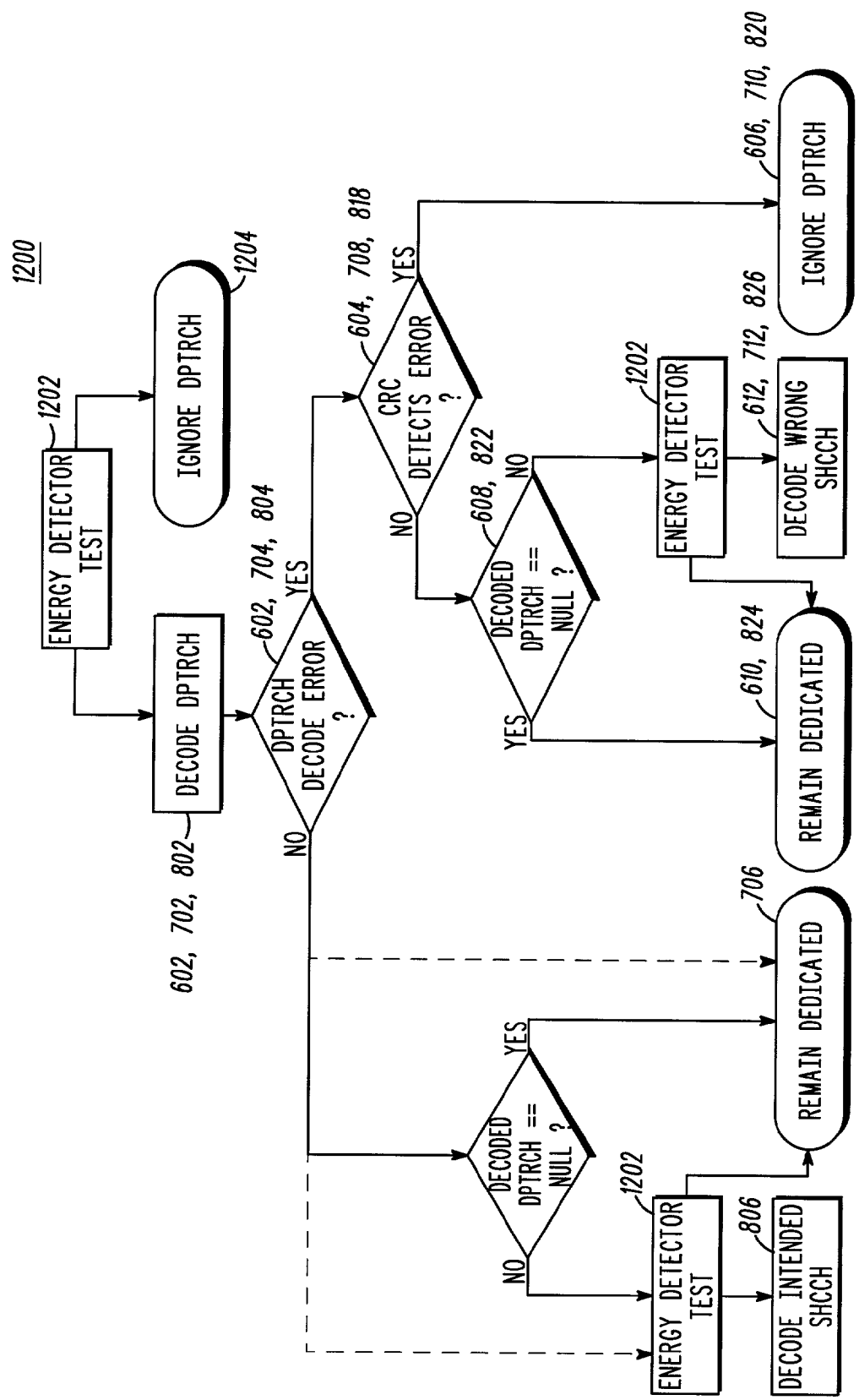
FIG. 12 is a logic flow diagram of the steps executed by the communication system of FIG. 1 in order to increase throughput in accordance with another embodiment of the present invention.

Referring now to FIGS. 11 and 12, a process is depicted whereby communication system 100, preferably processor 114 of mobile unit 104, increases throughput in ARQ and HARQ systems in accordance with another embodiment, an "energy detector test" embodiment, of the present invention. The energy detector test embodiment is premised on coloring performed by a long code scrambling mask. Since the long code mask is unique for given user, that is, for a given mobile unit 104, the received energy will be low if a DPTRCH frame or a SHCCH frame is decoded based on a Walsh code that is different from the Walsh code used to encode the information in the frame. Other coloring mechanisms that offer the same energy properties (i.e., yield similar energy values) may be used herein without departing from the spirit and scope of the present invention.

FIG. 11 is a logic flow diagram 1100 of steps executed by mobile unit 104 in performing an energy detector test in accordance with an embodiment of the present invention. The logic flow begins when processor 114 of mobile unit 104 computes (1102) an energy metric for a received control frame, such as an energy for a DPTRCH frame or a data field of a DPTRCH frame, or an energy for a SHCCH frame or a data field of a SHCCH frame, preferably by computing an energy corresponding to a data field of the frame. Processor 114 then compares (1104) the energy metric to an energy threshold to produce a comparison. The energy threshold is designed to function as an indicator of whether the control frame has been improperly or incorrectly received, demodulated, or decoded. Based on the comparison, processor 104 determines (1106) whether to ignore the received frame, preferably decoding (1108) another frame based on the received control frame, such as decoding a SHCCH frame based on a DPTRCH frame or decoding a SHCH frame based on a SHCCH frame when the computed energy metric compares favorably with the energy threshold, and ignoring (1110) the received control frame when the computed energy metric compares unfavorably with the energy threshold.

In one embodiment of the present invention, processor 114 computes the data field energy by despreading the chips corresponding to the bit, or data, field (e.g., the pointer bit field on the DPTRCH) in the frame to symbols and then summing the square of the in-phase and quadrature components of the symbols. The resulting computed frame energy (e.g., an energy 'Eptr' corresponding to a pointer bit field on the DPTRCH) can be compared by processor 114 to a threshold to determine channel reliability, wherein an energy level less than the threshold may indicate a noisy, unreliable channel and the frame should be ignored. Also a computed energy for one frame (N) can be compared by processor 114 to a computed energy of a subsequently received frame (N+1) to help determine which frame is most reliable and should be decoded. In this manner, each frame's computed energy is used as a threshold for determining whether to decode the other frame. In comparing frame (N+1) to frame (N), processor 114 preferably ignores the frame with less energy, possibly offset by a margin.

In another embodiment of the present invention, processor 114 may compute relative energy metrics since with the DPTRCH, the power control bit/reserve bit field is always sent while the pointer bits may not always be transmitted (i.e., may be discontinuously transmitted (DTX'd)). Processor 114 can compute an energy 'Epcb' for the power control bit/reserve bit field and an energy 'Eptr' for the pointer field. Processor 14 then determines a relative energy metric 'Eptr/Epcb,' and compares the relative energy metric to a threshold stored in memory 116 in order to determine channel (DPTRCH) reliability with regard to the pointer bits. For example, when Eptr/Epcb is greater than the threshold then the metric compares favorably with the threshold, indicating channel reliability, and when Eptr/Epcb is much less than the threshold then the metric compares unfavorably with the threshold, indicating channel unreliability. In other embodiments of the present invention, processor 114 can compute 'Eshcch/Epcb' where Eshcch is an energy computation corresponding to an SHCCH frame, and/or may compare the relative metrics between two or more frame intervals, wherein one metric, plus some margin, may function as a threshold for a determination of the reliability of the other frame. That is, when one metric varies from another metric by greater than a predetermined amount, then one of the two frames may be determined to be unreliable.

For example, in yet another embodiment of the energy detector test, processor 114 compares a despread energy of a DPTRCH frame to a first energy threshold stored in memory 116 (e.g., threshold_1). When the DPTRCH despread energy compares unfavorably with threshold_1 that is, is less than threshold_1, then the processor 'ignore(s) DPTRCH' (or equivalent). In still another energy detector test, processor 114 compares a despread energy of a SHCCH frame to a second energy threshold stored in memory 116 (e.g., threshold_2). When the SHCCH despread energy compares unfavorably with threshold_2, that is, is less than threshold_2, the mobile unit 'remain(s) dedicated' (or equivalent). In yet another embodiment of the energy detector test, processor 114 compares a despread energy of a DPTRCH frame to a despread energy of a SHCCH frame. When a difference between the DPTRCH and SHCCH despread energies compares unfavorably with a third energy threshold, that is, exceeds a third energy threshold stored in memory 116 (e.g., threshold_3) (i.e., when an absolute value of the difference is greater than threshold_3) then the processor may either 'ignore DPTRCH' or 'remain dedicated' (or equivalent).

Referring now to FIGS. 6, 7, 8, 11, and 12, in other embodiments of the present invention an energy detector test may be performed (1202) just prior to any one or more of the steps described above of decoding a DPTRCH (602, 702, 802), decoding (806) an SHCCH intended for mobile unit 104 and decoding (612, 712, 826) an SHCCH intended for a mobile unit other than mobile unit 104. For example, FIG. 12 is a logic flow diagram 1200 that includes a partial combination of each of logic flow diagrams 600, 700, 800, wherein each logic flow diagram of logic flow diagrams 600, 700, 800 is modified to provide for execution of an energy detector test by mobile unit 104 in accordance with another embodiment of the present invention. As depicted in FIG. 12, energy detector tests may be used before each of a decoding of a DPTRCH frame (602, 702, 802) and a decoding of a SHCCH frame (612, 712, 806, 826). The energy detector tests are especially useful when mobile unit 104 is no longer dedicated (can help make up for a small or non-existent CRC on the DPTRCH), and when the mobile unit is about to decode (612, 712, 826) an SHCCH intended for a mobile unit other than mobile unit 104. The energy detector tests are therefore complementary to the "flush tests", since the energy detector tests allow the mobile unit to ignore (606, 710, 820, 1204) a DPTRCH and avoid decoding an SHCCH intended for a mobile unit other than mobile unit 104 rather than unnecessarily flush the buffer.

In yet another embodiment of the present invention, communication system 100, preferably processor 114 of mobile unit 104, may perform a combination of the energy detector test and the flush test, that is, a hybrid test. The hybrid test looks for consistency across multiple control frames for a given packet (or transmission unit) like the flush test, but uses energy metrics to help decide, when inconsistent, whether to ignore the current frame or flush the previous frame and keep the new frame. In yet other embodiments of the present invention, the hybrid test may be combined with individual flush tests and/or energy tests as well.

For example, suppose two SHCCH frames, N and N+1, are decoded by processor 114 with no detected errors. Furthermore, let 'Eshcch(N)' represent the energy in SHCCH frame N and let 'Eshcch(N+1)' represent the energy in SHCCH frame N+1, which energy determinations preferably are made by processor 114. Then if SHCCH fields from SHCCH frame N and SHCCH frame N+1 are not the same/consistent but SHCCH frame N and SHCCH frame N+1 still appear to correspond to the same data packet, then processor 114 performs a SHCCH energy test.

A SHCCH energy test is as follows: If Eshcch(N)>Eshcch(N+1)+margin, then either (a) ignore current SHCCH or (b) choose SHCCH information from frame N, else (i.e., when Eshcch(N)<=Eshcch(N+1)+margin) choose the SHCCH information from frame N+1. If N+1 chosen then flush soft decision buffer and initialize with N+1 SHCH soft decision information.

Like the flush test, the hybrid test can be extended over more than two control frames corresponding to the same packet. For example, suppose that processor 114 determines that information included in SHCCH frame N+2 is inconsistent with the SHCCH frame/information chosen (either frame N or frame N+1) pursuant to the SHCCH energy test above but is consistent with the SHCCH information for the frame that was not chosen. Processor 114 then flushes the current soft decision buffer and re-initializes the buffer with N+2 SHCH soft decision information. Processor 114 also assumes that the N+1 SHCCH information is the correct information for all subsequent retransmissions and uses the N+1 SHCCH information as a reference for a testing of subsequently processed SHCCH frames. Processor 114 then does not use future SHCCH frames corresponding to retransmissions with inconsistent information (with regard to the reference).

In yet other embodiments of the present invention, the hybrid test may include a relative comparison. For example, when DPTRCH frames includes fields that are always sent (e.g., power control bits, or pcb's) and fields which are only sent when mobile unit 104 is receiving the SHCCH (e.g., a pointer field, or pntr) then a relative energy comparison is possible. That is, processor 114 determines an energy of the pointer field ('Eptr') and an energy of the power control bits ('Epcb'). Processor 114 compares Eptr to Epcb, for example by determining a ratio Eptr/Epcb, and compares the data field energy comparison to a comparison threshold stored in memory 116 (e.g., comparing Eptr/Epcb to a threshold_4). Processor 114 then determines whether to ignore a frame or decode a frame based on the comparison of the data field energy comparison to the comparison threshold.

For example, suppose Eptr/Epcb is less than threshold_4. Processor 114 may then decide to ignore the DPTRCH, to not decode the SHCCH, and to not decode the current shared data channel (SHCH). Processor 114 can also perform such an energy check with respect to the SHCCH where a ratio of an energy of a SHCH frame ('Eshch') to Epcb, that is, Eshch/Epcb, is compared to another comparison threshold stored in memory 116, that is, threshold_5. When Eshch/Epcb is less than threshold_5, processor 114 does not use the SHCCH information and does not decode the current shared data channel (SHCH). It is also possible for processor 114 to compare a determined ratio Eptr/Epcb(N) for frame interval N to a determined ratio Epntr/Epcb(N+1) for frame interval N+1 and decide which SHCCH channel is correct given that there are inconsistent bit fields between the N and N+1 SHCCH frames. For example, if Eptr/Epcb(N)<Eptr/Epcb(N+1), then processor 114 may decide to keep SHCCH information from frame interval N+1, and to otherwise keep SHCCH information from frame interval N.

In addition to the embodiments of the present invention disclosed above, other embodiments of the present invention may include one or more of the following listed considerations:

1. Mobile unit 104 should be required to not see at least two DPTRCH frames before going dormant.
2. As an alternative to long code scrambling/coloring, a CRC of an SHCCH frame can be colored with a UID corresponding to mobile unit 104. This will greatly reduce the probability of misinterpreting another mobile unit's SHCCH. $[P_1 P_{M1}(1-P_2) \rightarrow P_1 P_{M1}(1-P_2) P_{M2}]$ All mobile units in communication system 100 may have to have a broadcast UID as well.
3. Without coloring, assuming $P_1 \approx = P_2$ and $P_{M1} \approx = P_{M2}$, a probability of combining and a wrong SHCCH correctly and (b) decoding terms are fairly symmetrical, there may be at the expense of the SHCCH, or vice versa. The same may be said with respect to the error detection on the DPTRCH and SHCCH.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for receiving data in a wireless communication system comprising steps of:
   receiving shared channel data over a shared channel;
   storing the received shared channel data to produce stored shared channel data;
   receiving shared control channel data over a shared control channel;
   decoding the received shared control channel data to produce decoded shared control channel data;
   determining whether the decoded shared control channel data differs from previously received shared control channel data; and
   when the decoded shared control channel data differs from previously received shared control channel data, dispensing with at least one of the decoded shared control channel data and the stored shared channel data.

2. The method of claim 1, wherein the step of determining whether the decoded shared control channel data differs from previously received shared control channel data comprises a step of:
   determining whether a decoding error has occurred with respect to the decoded shared control channel data; and
   when no decoding error is determined to have occurred with respect to the decoded shared control channel data, determining whether the decoded shared control channel data differs from previously received shared control channel data.

3. The method of claim 2, further comprising steps of:
   when a decoding error is determined to have occurred with respect to the received shared control channel data, performing an error detection test on the received shared control channel data;
   when the error detection test detects an error, ignoring the received shared control channel data.

4. The method of claim 1, wherein the step of determining whether the decoded shared control channel data differs from previously received shared control channel data comprises a step of determining whether the decoded shared control channel data differs from previously received shared control channel data in a manner inconsistent with a protocol causing a protocol error.

5. The method of claim 1, wherein the data received over the shared control channel comprises a frame, wherein the step of determining whether the decoded shared control channel data differs from previously received shared control channel data comprises a step of determining whether the decoded shared control channel frame differs from a previously received shared control channel frame, and wherein the step of dispensing comprises a step of, when the decoded shared control channel frame differs from a previously received shared control channel frame, purging the stored shared channel data.

6. The method of claim 1, wherein the data received over the shared control channel comprises a frame, wherein the step of determining whether the decoded shared control channel data differs from previously received shared control channel data comprises a step of determining whether the decoded shared control channel frame differs from one or more frames of a plurality of previously received shared control channel frames, and wherein the step of dispensing comprises a step of, when the decoded shared control channel frame differs from the one or more frames of the plurality of previously received shared control channel frames, ignoring the decoded shared control channel frame.

7. The method of claim 1, wherein the step of receiving data over a shared control channel comprises a step of receiving each of a first frame and a second frame over a shared control channel, wherein the step of decoding the received shared control channel data comprises steps of decoding the first frame to produce a decoded first frame and decoding the second frame to produce a decoded second frame, wherein the step of determining whether the decoded shared control channel data differs from previously received shared control channel data comprises steps of:
   comparing the decoded first frame to the decoded second frame to produce a comparison;
   determining whether the decoded first frame differs from the decoded second frame;
   when the decoded first frame differs from the decoded second frame but each of the decoded first frame and the decoded second frame appears to correspond to a same data packet, performing steps of:

computing a first energy level for the first frame;
computing a second energy level for the second frame;
comparing the first energy level to the second energy level to produce a comparison; and
wherein the step of dispensing comprises a step of ignoring one of the decoded first frame and the decoded second frame based on the comparison.

8. The method of claim 1, wherein the method further comprises steps of:
receiving dedicated pointer channel data over a dedicated pointer channel, wherein the dedicated pointer channel data comprises a plurality of dedicated pointer channel frames;
when the decoded shared control channel data differs from previously received shared control channel data:
computing a first energy level for a first dedicated pointer channel frame of the plurality of dedicated pointer channel frames;
computing a second energy level for a second dedicated pointer channel frames of the plurality of dedicated pointer channel frames;
comparing the first energy level to the second energy level to produce an energy metric;
comparing the energy metric to a threshold; and
ignoring the dedicated pointer channel when the energy metric compares unfavorably with the threshold.

9. The method of claim 1, wherein the method further comprises steps of:
receiving dedicated pointer channel data over a dedicated pointer channel, wherein the dedicated pointer channel data comprises a plurality of data fields and points to the shared control channel;
when the decoded shared control channel data differs from previously received shared control channel data:
computing a first energy level for a first data field of the plurality of data fields;
computing a second energy level for a second data field of the plurality of data fields;
comparing the first energy level to the second energy level to produce an energy metric;
comparing the energy metric to a threshold; and
ceasing decoding of data received over at least one of the shared control channel and the shared channel when the energy metric compares unfavorably with the threshold.

10. A method for receiving data in a wireless communication system comprising steps of:
receiving shared control channel data over a shared control channel;
receiving shared channel data over a shared channel;
determining a first energy level corresponding to the received shared control channel data;
determining a second energy level corresponding to the received shared channel data;
comparing the first energy level to the second energy level to produce an energy metric;
comparing the determined energy metric to a threshold; and
ignoring the shared control channel data when the energy metric compares unfavorably with the threshold.

11. The method of claim 10, wherein the received data comprises a frame and wherein the step of determining an energy level comprises a step of computing an energy corresponding to a data field of the frame.

12. The method of claim 11, wherein the shared control channel is a dedicated pointer control channel and the data field comprises a pointer bit field of a frame received over the dedicated pointer control channel.

13. The method of claim 10, further comprising a step of ceasing decoding of data received over the shared channel when the energy metric compares unfavorably with the threshold.

14. A method for receiving data in a wireless communication system comprising steps of:
receiving shared control channel data over a shared control channel;
receiving dedicated pointer control channel data over a dedicated pointer control channel;
determining a first energy level corresponding to the received shared control channel data;
determining a second energy level corresponding to the received dedicated pointer control channel data;
comparing the first energy level to the second energy level to produce an energy metric;
comparing the determined energy metric to a threshold; and
ignoring the dedicated pointer control channel data when the energy metric compares unfavorably with the threshold.

15. The method of claim 14, further comprising a step of ceasing decoding of data received over at least one of the shared control channel and a shared channel when the energy metric compares unfavorably with the threshold.

16. A communication device comprising:
a receiver that receives shared control channel data over a shared control channel and shared channel data over a shared channel;
a memory that stores previously received shared control channel data and further stores previously received shared channel data to produce stored shared channel data; and
a processor operably coupled to each of the receiver and the memory that decodes the received shared control channel data to produce decoded shared control channel data, determines whether the decoded shared control channel data differs from previously received shared control channel data, and when the decoded shared control channel data differs from previously received shared control channel data, dispenses with at least one of the decoded shared control channel data and the stored shared channel data.

17. The communication device of claim 16, wherein the data received over the shared control channel comprises a shared control channel frame, wherein the determination, by the processor, of whether the decoded shared control channel data differs from previously received shared control channel data comprises determining whether the decoded shared control channel frame differs from a previously received shared control channel frame, and wherein the processor purges the stored shared channel data when the decoded shared control channel frame differs from a previously received shared control channel frame.

18. The method of claim 16, wherein the data received over the shared control channel comprises a shared control channel frame, wherein the determination, by the processor, of whether the decoded shared control channel data differs from previously received shared control channel data comprises determining whether the decoded shared control channel frame differs from one or more frames of a plurality of previously received shared control channel frames, and wherein the processor ignores the decoded shared control channel frame when the decoded shared control channel frame differs from the one or more frames of the plurality of previously received shared control channel frames.

19. The communication device of claim 16, wherein the reception, by the receiver, of data over a shared control channel comprises receiving each of a first frame and a second frame over a shared control channel, wherein decoding, by the processor, of the received shared control channel data comprises decoding the first frame to produce a decoded first frame and decoding the second frame to produce a decoded second frame, and wherein the determination, by the processor, of whether the decoded shared control channel data differs from previously received shared control channel data comprises comparing the decoded first frame to the decoded second frame to produce a comparison, determining whether the decoded first frame differs from the decoded second frame, and when the decoded first frame differs from the decoded second frame but each of the decoded first frame and the decoded second frame appears to correspond to a same data packet, computing a first energy level for the first frame, computing a second energy level for the second frame, comparing the first energy level to the second energy level to produce a comparison, and wherein the processor ignores one of the decoded first frame and the decoded second frame based on the comparison.

20. The communication device of claim 16, wherein the receiver further receives dedicated pointer channel data over a dedicated pointer channel, wherein the dedicated pointer channel data comprises a plurality of dedicated pointer channel frames, and, wherein the processor, when the decoded shared control channel data differs from previously received shared control channel data, further computes a first energy level for a first dedicated pointer channel frame of the plurality of dedicated pointer channel frames computes a second energy level for a second dedicated pointer channel frame of the plurality of dedicated pointer channel frames, compares the first energy level to the second energy level to produce an energy metric, compares the energy metric to a threshold, and ignores the dedicated pointer channel when the energy metric compares unfavorably with the threshold.

21. The communication device of claim 16, wherein the receiver further receives dedicated pointer channel data over a dedicated pointer channel, wherein the dedicated pointer channel data comprises a plurality of data fields and points to the shared control channel, and wherein the processor, when the decoded shared control channel data differs from previously received shared control channel data, further computes a first energy level for a first data field of the plurality of data fields, computes a second energy level for a second data field of the plurality of data fields, compares the first energy level to the second energy level to produce an energy metric, compares the energy metric to a threshold, and ceases decoding of data received over at least one of the shared control channel and the shared channel when the energy metric compares unfavorably with the threshold.

22. A communication device comprising:
  a receiver that receives shared control channel data over a shared control channel and receives shared channel data over a shared channel; and
  a processor operably coupled to the receiver that determines determines a first energy level corresponding to the received shared control channel data, determines a second energy level corresponding to the received shared channel data, compares the first energy level to the second energy level to produce an energy metric, and ignores the shared control channel data when the energy metric compares unfavorably with the threshold.

23. The communication device of claim 22, wherein the processor further ceases decoding data received over the shared channel when the energy metric compares unfavorably with the threshold.

24. A communication device comprising:
  a receiver that receives shared control channel data over a shared control channel and receives dedicated pointer control channel data over a dedicated pointer control channel; and
  a processor that determines a first energy level corresponding to the received shared control channel data, determines a second energy level corresponding to the received dedicated pointer control channel data, compares the first energy level to the second energy level to produce an energy metric, and ignores the dedicated pointer control channel data when the energy metric compares unfavorably with the threshold.

25. The communication device of claim 24, wherein the processor further ceases decoding data received over at least one of the shared control channel and a shared channel when the energy metric compares unfavorably with the threshold.

* * * * *